(No Model.)

T. F. ROWLAND.
WELDING MACHINE.

No. 375,836. Patented Jan. 3, 1888.

Witnesses:
Geo. W. Miatt
A. E. F. Hansmann

Inventor:
Thomas F. Rowland
By his Attorneys
Dickerson Foster & Freeman

UNITED STATES PATENT OFFICE.

THOMAS F. ROWLAND, OF NEW YORK, N. Y.

WELDING-MACHINE.

SPECIFICATION forming part of Letters Patent No. 375,836, dated January 3, 1888.

Application filed April 21, 1887. Serial No. 235,693. (No model.)

*To all whom it may concern:*

Be it known that I, THOMAS F. ROWLAND, of the city, county, and State of New York, have invented a new and useful Improvement in Welding-Machines, of which the following is a full, true, and complete description, reference being had to the accompanying drawings.

The object of my invention is to improve the present construction of roller-welding mills; and my invention is shown as applied to a mill capable of welding a longitudinal seam in a cylinder, though I do not limit myself to this form of machine.

My invention will be readily understood from the accompanying drawings, in which—

Figure 1:
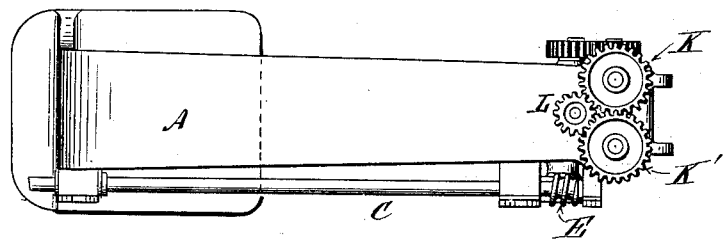
Figure 2:
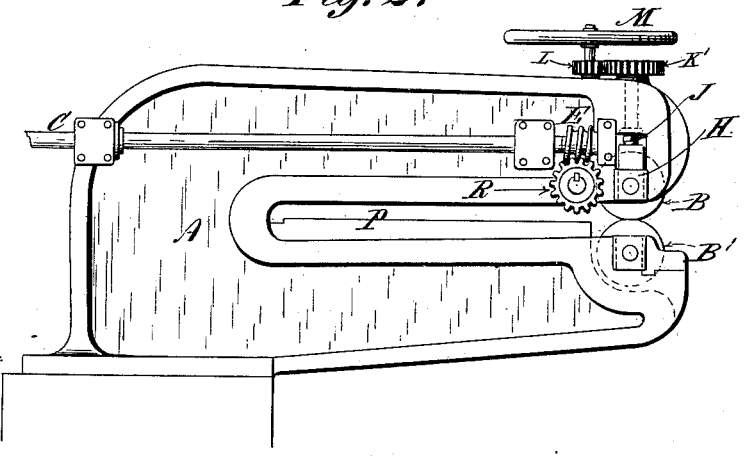
Figure 3:
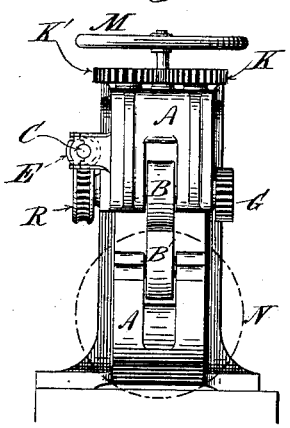
Figure 4:
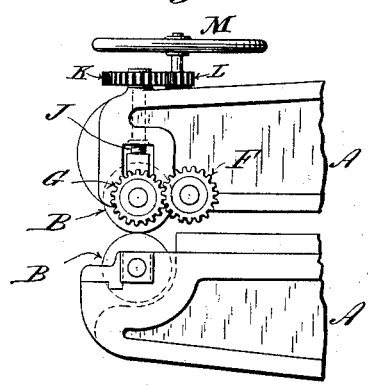

Figure 1 represents a top view with the actuating hand-wheel removed; Fig. 2, a side elevation; Fig. 3, an end elevation showing the welding-rollers and the cylinder in place; Fig. 4, a view of the welding mechanism on the opposite side from that shown in Fig. 2.

Similar letters refer to similar parts in all the drawings.

The frame of the machine consists of two substantially parallel arms, of sufficient strength, carrying the welding-rollers at their extremities. Sufficient space is allowed between these arms to receive the cylinder or other body in the process of welding, and the guide P is preferably added to the lower roller to support the inner end of the body to be welded.

The welding-rollers are shown at B B', and may be of any suitable shape. As shown, they are arranged to weld a cylinder, and therefore the upper roll, B, is slightly concave on its face, and the lower roll, B', slightly convex. The lower roll, B', is an idle-roll, and is carried in fixed bearings. The upper roll, B, is driven by means of the gear-wheels F G, Fig. 4. The gear-wheel F is on the same shaft with and driven by the worm-wheel R, which is driven by the worm E and by the driving-shaft C. It is of course essential to vertically adjust the roller B in order to receive the material to be welded, and it is also desirable to be able to vary its pressure during the welding process. By my improvement I am enabled to do this without stopping the machine. The upper roller, B, is mounted in two sliding blocks, H, which can be slid up and down in the upper arm of the frame in suitable guides, as shown. The position of these blocks is determined by suitable screws, J, driven by the shafts of the wheels K K'. These wheels are driven by the pinion-wheel L, moved by the hand-wheel M. The screws J are right and left hand, so that the reverse motion of the wheels K K' will simultaneously and equally elevate and depress the boxes H, and thereby simultaneously move both ends of the roller B.

The operation of my mill is easily understood. The hand-wheel M is turned so as to separate the welding-rollers B B'. They are then brought together with sufficient pressure to do the welding, and the driving-shaft C is started. The pressure can be varied during the welding process, and the cylinder or body to be welded can be run backward and forward several times by reversing the movement of the shaft C. The peculiar construction of the wheels F, G, K, K', and L enables me to accomplish the vertical adjustment of the roller B without stopping the machine.

What I claim as my invention, and desire to secure by Letters Patent, is—

1. The combination, in a welding-mill, of the roller B', the vertical adjustable roller B, the gears F G, capable of motion past each other, the right and left hand screws J, wheels K K', driving the screws, and actuating-wheel L, substantially as described.

2. The combination, in a welding-mill, of the roller B, carried at both ends by the right and left hand screws J, the wheels K K', driving such wheels, and the actuating-wheel L, substantially as described.

In testimony whereof I have signed my name to this specification in the presence of two subscribing witnesses.

THOMAS F. ROWLAND.

Witnesses:
WARREN E. HILL,
CHAS. F. HATHAWAY.